US009697793B2

(12) United States Patent
Chung et al.

(10) Patent No.: US 9,697,793 B2
(45) Date of Patent: Jul. 4, 2017

(54) FLAT DISPLAY APPARATUS AND CONTROL CIRCUIT AND METHOD FOR CONTROLLING THE SAME

(71) Applicant: AU OPTRONICS CORP., Hsin-Chu (TW)

(72) Inventors: Chun-Fan Chung, Hsin-Chu (TW); Tien-Lun Ting, Hsin-Chu (TW); Chia-Chi Tsai, Hsin-Chu (TW); Ming-Hung Tu, Hsin-Chu (TW); Chien-Huang Liao, Hsin-Chu (TW); Yu-Chieh Chen, Hsin-Chu (TW); Pin-Miao Liu, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 208 days.

(21) Appl. No.: 14/590,414

(22) Filed: Jan. 6, 2015

(65) Prior Publication Data

US 2015/0116305 A1 Apr. 30, 2015

Related U.S. Application Data

(63) Continuation of application No. 12/333,292, filed on Dec. 11, 2008, now abandoned.

(30) Foreign Application Priority Data

Jan. 25, 2008 (TW) ............................ 097103014 A

(51) Int. Cl.

| | |
|---|---|
| ***G06F 3/038*** | (2013.01) |
| ***G09G 5/00*** | (2006.01) |
| ***G09G 3/36*** | (2006.01) |

(52) U.S. Cl.
CPC ............ *G09G 5/00* (2013.01); *G09G 3/3674* (2013.01); *G09G 2300/0413* (2013.01);
(Continued)

(58) Field of Classification Search
CPC .................. G09G 5/00; G09G 3/3674; G09G 2300/0413; G09G 2310/066;
(Continued)

(56) References Cited

U.S. PATENT DOCUMENTS 6,359,607 B1 3/2002 Yanagi et al.
6,867,760 B2 3/2005 Yanagi et al.
(Continued)

FOREIGN PATENT DOCUMENTS

JP 2003208141 7/2003

*Primary Examiner* — Andrew Sasinowski
*Assistant Examiner* — Brent D Castiaux
(74) *Attorney, Agent, or Firm* — WPAT, PC

(57) ABSTRACT

In an exemplary flat display apparatus and control circuit and method for controlling the flat display apparatus, the flat display apparatus includes a plurality of gate driving units, each of which controls the operation of a scan line in the flat display apparatus. The flat display apparatus provides a first gate high level voltage signal and a second gate high level voltage signal to the gate driving units such that the first and second gate high level voltage signals are used as voltage signals transmitted to corresponding scan lines. The first and second gate high level voltage signals respectively include a falling edge with a slope. Duration time of the falling edge of the first gate high level voltage signal is longer than that of the falling edge of the second gate high level voltage signal.

12 Claims, 8 Drawing Sheets

(52) U.S. Cl.
CPC ............... *G09G 2310/0267* (2013.01); *G09G 2310/066* (2013.01); *G09G 2310/08* (2013.01); *G09G 2320/0219* (2013.01); *G09G 2320/0223* (2013.01)

(58) Field of Classification Search
CPC ....... G09G 2310/0267; G09G 2310/08; G09G 2320/0223; G09G 2320/0219
See application file for complete search history.

(56) References Cited

U.S. PATENT DOCUMENTS

| | | | | |
|---|---|---|---|---|
| 6,982,684 | B2 | 1/2006 | Tsuchihashi | |
| 7,027,024 | B2 | 4/2006 | Yanagi et al. | |
| 7,164,405 | B1 | 1/2007 | Jeong et al. | |
| 7,199,777 | B2 | 4/2007 | Moon | |
| 7,304,626 | B2 | 12/2007 | Yanagi et al. | |
| 7,808,267 | B2 | 10/2010 | Lee et al. | |
| 7,924,255 | B2 | 4/2011 | Hsu et al. | |
| 2002/0057245 | A1 | 5/2002 | Yanagi et al. | |
| 2004/0032630 | A1 | 2/2004 | Aoki et al. | |
| 2006/0077163 | A1 | 4/2006 | Yanagi et al. | |
| 2007/0040795 | A1 | 2/2007 | Lee et al. | |
| 2007/0159441 | A1* | 7/2007 | Yang | G09G 3/3677 345/99 |
| 2008/0192032 | A1* | 8/2008 | Park | G09G 3/3677 345/204 |

* cited by examiner

FLAT DISPLAY APPARATUS AND CONTROL CIRCUIT AND METHOD FOR CONTROLLING THE SAME

CROSS-REFERENCE TO RELATED APPLICATIONS

This application is based upon and claims the benefit of priority from the prior Taiwanese Patent Application No. 097103014, filed Jan. 25, 2008, the entire contents of which are incorporated herein by reference.

BACKGROUND OF THE INVENTION

Technical Field

The present invention relates to a flat display apparatus, a control circuit and a control method employed therein, especially a flat display apparatus using different signals to drive horizontal scanning lines of the flat display device, a control circuit and a control method for controlling the flat display apparatus Description of the Related Art Flat display devices such as liquid crystal displays have been widely used in all kinds of electronic devices. With the extending demands of customers, sizes of display screen of the flat displays have developed from small size originally employed in portable computers to middle size employed in desktop computers, and then to large size employed in family cinema gradually. It is important to maintain a displaying uniformity of a whole screen with the increasing size of the display screen.

Following the increasing size of the display device, amount of display unit defined in the display device for displaying image called as pixel is also increasing. Even a refresh frequency of an image does not increase, a transition of voltage level of scanning signal must be faster to satisfy a displaying demand because of the increasing pixels. However, the faster transition of voltage level results in a feed-though effect of a capacitor generated by a capacitive coupling effect, which causes a stored voltage of the pixel changed. Therefore, the displaying uniformity is challenged in both horizontal and vertical directions.

Referring to FIG. 7, a block diagram of a typical liquid crystal display is shown. The liquid crystal display 10 includes a control circuit 100, a data driving module 110, a gate driving module 120, and a display panel 130. The control circuit 100 receives display data and all kinds of control data needed for displaying. The control circuit 100 transforms the display data and a part of the control data to first signals needed by the data driving module 110, and outputs the first signals to the data driving module 110. The control circuit 100 transforms the other part of the control data to second signals needed by the gate driving module 120 and outputs the second signals to the gate driving module 120. The data driving module 110 drives the data lines 112, 114 according to the received first signals, and the gate driving module 120 drives the scanning lines 122, 124 according to the received second signals. In the display panel 130, each pixel 132 denoted by a dotted frame is formed at the intersections of the data line 112, 114 and the scanning line 122, 124.

Referring to FIG. 8A and FIG. 8B, FIG. 8A is an equivalent circuit diagram of a pixel 132 of the liquid crystal display 10 in FIG. 7, and FIG. 8B is a signal wave diagram of a driving signal employed in the gate driving module 120 in FIG. 7 for driving the gate line 122. The pixel 132 includes a thin film transistor 200, a liquid crystal capacitor $C_{LC}$, a storage capacitor $C_S$, and a parasitic capacitor $C_{GD}$. The gate electrode 200*c* of the thin film transistor 200 is electrically coupled to the scanning line 122. The source electrode 200*a* of the thin film transistor 200 is electrically coupled to the data line 114. The drain electrode 200*b* of the thin film transistor 200 is electrically coupled to a terminal of the liquid crystal capacitor $C_{LC}$, a terminal of the storage capacitor $C_S$, and a terminal of the parasitic capacitor $C_{GD}$. The other terminal of the liquid crystal capacitor $C_{LC}$ and the other terminal of the storage capacitor $C_S$ are configured for receiving a common voltage $V_{COM}$. The other terminal of the parasitic capacitor $C_{GD}$ is electrically connected to the scanning line 122.

As shown in FIG. 8B, when the scanning signal is provided to the scanning line 122, after a low level voltage Vgl changes to reach a high level voltage Vgh via a rising edge RE, the thin film transistor 200 is turned on due to the high level voltage Vgh been provided to the gate electrode 200*c*. On the contrary, when the high level voltage Vgh changes to reach a low level voltage Vgl via a falling edge FE, the thin film transistor 200 is turned off due to the decreasing voltage provided to the gate electrode 200*c*. However, a fast transition of the voltage at the rising edge RE and the falling edge FE results in a capacitive coupling effect of the parasitic capacitor $C_{GD}$ between the gate 200*c* and drain electrodes 200*b* of the thin film transistor 200. Thus, a voltage maintain at the drain electrode 200*b* is changed to make a potential crossing the liquid crystal capacitor $C_{LC}$ deviated from a original pre-stored potential. A difference of the actual potential crossing the liquid crystal capacitor $C_{LC}$ and the original pre-stored potential is call as a feed-though voltage $V_f$.

If the feed-though voltages $V_f$ in all the display panel 130 are same, a problem caused by the feed-though voltage $V_f$ can easily be solved. However, in fact, the feed-though voltages $V_f$ respectively corresponding to each pixel in all the display panel 130 are different. In the horizontal direction, the difference of the feed-though voltages $V_f$ are mainly caused by a signal delay of the scanning lines which make an operation of turning off the thin film transistors 200 arranged in a same scanning line inconsistent. In the vertical direction, the difference of the feed-though voltages $V_f$ are mainly caused by a voltage drop of a current and a resistance. When the gate high level voltage Vgh and the gate low level voltage Vgl are provided to the display panel 130, the wires layout made from different conducting lines, such as metal lines or thin film lines, generate voltage drop thereof. In any case, when signals transmit along the conducting lines (gate lines), a voltage difference (Vgh−Vgl) of the gate lines is gradually decreased with the signals been transmitted downward along the gate lines. The feed-through voltage $V_f$ can be obtained according to following formula:

$$V_f = (V_{gh} - V_{gl})\frac{C_{GD}}{C_S + C_{LC} + C_{GD,ON}}$$

wherein $C_{GD,ON}$ is a parasitic capacitor of the conductive thin film transistor 200. That is, if the voltage difference (Vgh−Vgl) of the gate lines varies in the vertical direction, the feed-through voltage $V_f$ is inevitably changes following the variation of the voltage difference.

To solve the above described problems, many solutions are provided. These solutions are all aimed at solving the uneven display generated by the feed-through effect of the scanning lines arranged in the horizontal direction. In fact, these solutions did achieve some improvement in a manner, such as U.S. Pat. No. 6,359,607, U.S. Pat. No. 6,867,760, U.S. Pat. No. 7,027,024 and U.S. published application No. 2006/0077163, et al. However, after experimental proof, these solutions can only solve a problem of uneven display in the horizontal direction and can not solve the uneven display in the vertical direction. The following chart 1 shows a plurality of voltage differences (Vgh−Vgl) at corresponding areas in a 40 inches LCD panel (it is assumed that the 40 inches LCD panel is divided into sixteen areas arranged as a 4×4 matrix) when normal signals are provided to the 40 inches LCD panel.

CHART 1

| | | | |
|---|---|---|---|
| 5.99 | 6.27 | 6.31 | 6.25 |
| 6.00 | 6.27 | 6.31 | 6.25 |
| 6.00 | 6.26 | 6.31 | 6.24 |
| 6.02 | 6.28 | 6.33 | 6.28 |

After employing the technology provided by the U.S. Pat. No. 6,359,607, the voltage differences (Vgh−Vgl) at corresponding areas of the same LCD panel are shown in Chart 2.

CHART 2

| | | | |
|---|---|---|---|
| 6.23 | 6.29 | 6.35 | 6.31 |
| 6.26 | 6.32 | 6.37 | 6.33 |
| 6.26 | 6.32 | 6.37 | 6.33 |
| 6.27 | 6.33 | 6.37 | 6.37 |

To sum up, after using the technology provided by the U.S. Pat. No. 6,359,607, the voltage differences (Vgh−Vgl) in the horizontal direction may be improved in a manner. However, the voltage differences (Vgh−Vgl) in the vertical direction is not only improved, but also become larger than that using original technology in a manner. In other words, after using the technology, the uniformity of displaying in the vertical direction becomes worse.

SUMMARY OF THE INVENTION

In one aspect, an exemplary control method for a flat display apparatus is provided. The flat display apparatus includes a plurality of gate driving units each of which controls the operation of a scan line. The method comprises providing a first gate high level voltage signal and a second gate high level voltage signal to the gate driving units such that the first and second gate high level voltage signals are used as voltage signals transmitted to corresponding scan lines. The first and second gate high level voltage signals respectively include a falling edge with a slope. A duration time of the falling edge of the first gate high level voltage signal is longer than that of the falling edge of the second gate high level voltage signal.

In the exemplary embodiment, the above described control method firstly generate a original gate high level voltage signal with fixed frequency, a first chamfering control signal, and a second chamfering control signal, then generate the first gate high level voltage signal by gradually decreasing the voltage of the original gate high level voltage signal in an duty cycle of the first chamfering control signal. the second gate high level voltage signal can similarly be generated by gradually decreasing the voltage of the original gate high level voltage signal in another duty cycle of the second chamfering control signal. The duty cycle of the first chamfering control signal is longer than that of the second chamfering control signal.

In another aspect, an exemplary control circuit of a flat display apparatus is provided. The flat display apparatus employs an enable signal to turn on a plurality of scanning lines thereof. The control circuit includes a signal generating module, a first gate driving unit, a second gate driving unit. The signal generating module is configured for generating a first gate high level voltage signal and a second gate high level voltage signal. The first gate driving unit is electrically coupled to the signal generating module and configured for receiving the first gate high level voltage signal as a voltage signal for providing to one of the scanning lines. The second gate driving unit is electrically coupled to the signal generating module and configured for receiving the second gate high level voltage signal as a voltage signal for providing to other one of the scanning lines. The first gate driving unit and the second gate driving unit are electrically coupled to each other so as to sequentially transmit the enable signal. The first gate high level voltage signal and second gate high level voltage signal respectively include a falling edge with a slope. A duration time of the falling edge of the first gate high level voltage signal is longer than that of the falling edge of the second gate high level voltage signal.

In the exemplary embodiment, the above described signal generating module includes the chamfering control signal generating unit and gate high level voltage signal generating unit. The chamfering control signal generating unit is used for generating the first chamfering control signal and the second chamfering control signal with different duty cycles. The gate high level voltage signal generating unit is electrically coupled to the chamfering control signal generating unit so as to receive the first chamfering control signal and the second chamfering control signal and respectively change a falling edge of the original gate high level voltage signal to generate the first and second gate high level voltages according to the first and second chamfering control signal.

Still in another aspect, an exemplary flat display apparatus is provided. The flat display apparatus includes a display panel, a plurality of data driving units, and a control circuit. The display panel includes a plurality of data lines, a plurality of scanning lines, and a plurality of pixel units. The data lines are paralleled extended on the display panel along a first direction for transmitting image data used for display image. The scanning lines are paralleled extended on the display panel along a second direction. The pixel units are positioned adjacent the intersections of the data lines and the scanning lines. The scanning lines are configured for turning on/off the pixel units. The data driving units are respectively electrically coupled to the data lines for providing the image data used for displaying image. The control circuit includes a signal generating module, a first gate driving unit, and a second gate driving unit. The signal generating module is configured for generating a first gate high level voltage signal and a second gate high level voltage signal. The first gate driving unit is electrically coupled to the signal generating module and configured for receiving the first gate high level voltage signal as a voltage signal for providing to one of the scanning lines. The second gate driving unit is electrically coupled to the signal generating module and configured for receiving the second gate high level voltage signal as a voltage signal for providing to other one of the scanning lines. The first gate driving unit and the second gate driving unit are electrically coupled to each other so as to sequentially transmit the enable signal. The first gate high level voltage signal and second gate high level voltage signal respectively include a falling edge with a slope. A duration time of the falling edge of the first gate high level voltage signal is longer than that of the falling edge of the second gate high level voltage signal.

Aforementioned embodiments of the present invention provide different driving signals to different gate driving units, and the falling edges have a same slope and a different duration time. Thus different compensations for different feed-through voltages are provided according to different position of the display panel. An experiment proves that this method can provides a uniform display in the vertical direction.

Other objectives, features and advantages of the touch panel device will be further understood from the further technological features disclosed by the embodiments of display system wherein there are shown and described preferred embodiments of this flat display apparatus, simply by way of illustration of modes best suited to carry out the present invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE INVENTION

Figure 1:
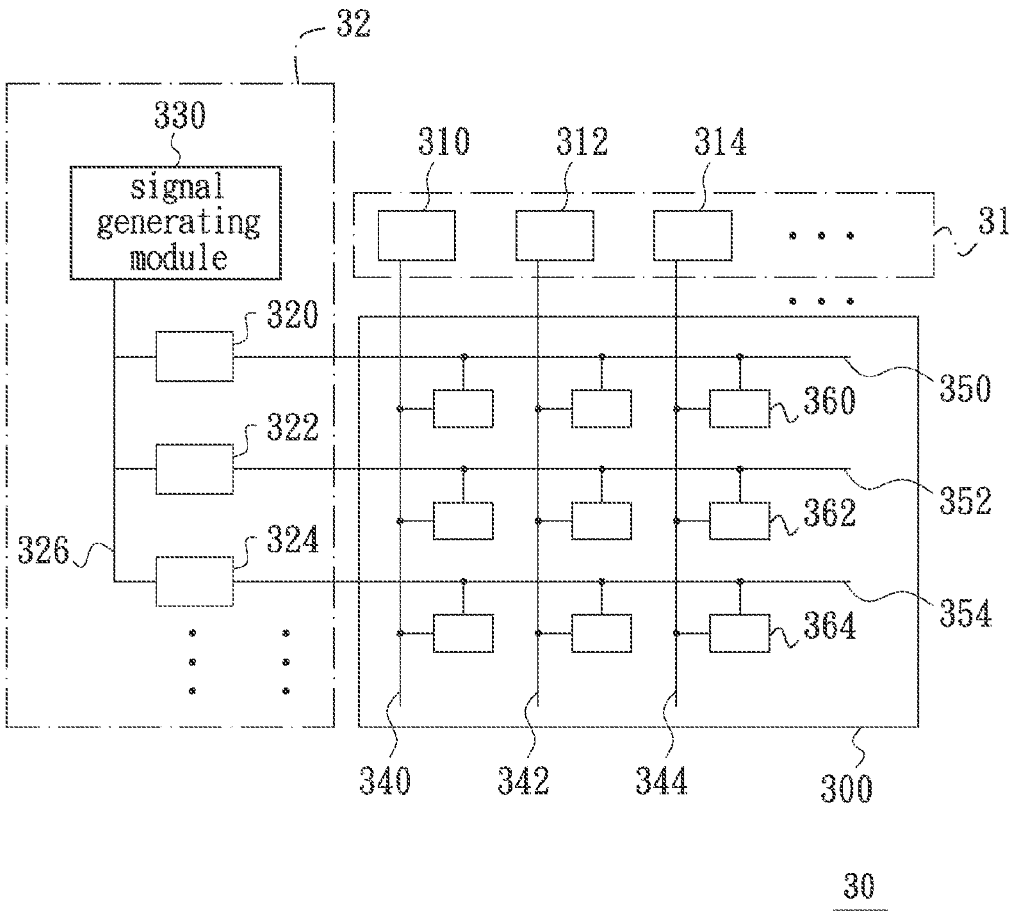
FIG. 1 is circuit block diagram of a flat display apparatus according to a first embodiment.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, a block diagram of a flat display apparatus 30 according to a first embodiment is shown. In the exemplary embodiment, the flat display apparatus 30 includes a display panel 300, a data driving module 31, and a control circuit 32. A plurality of data lines 340, 342, 344, a plurality of scanning lines 350, 352, 354 and a plurality of pixel units 360, 362, 364 positioned adjacent the intersections of the data lines 340, 342, 344 and the scanning lines 250, 352, 354 are all arranged in the display panel 300.

Figure 8A:
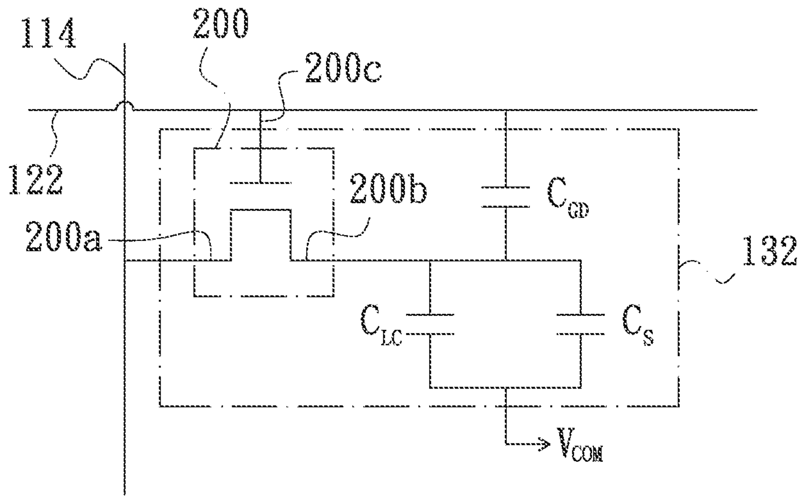
FIG. 8A (Prior Art)
FIG. 8A is an equivalent circuit diagram of a pixel of the liquid crystal display of FIG. 7.
Figure 8B:
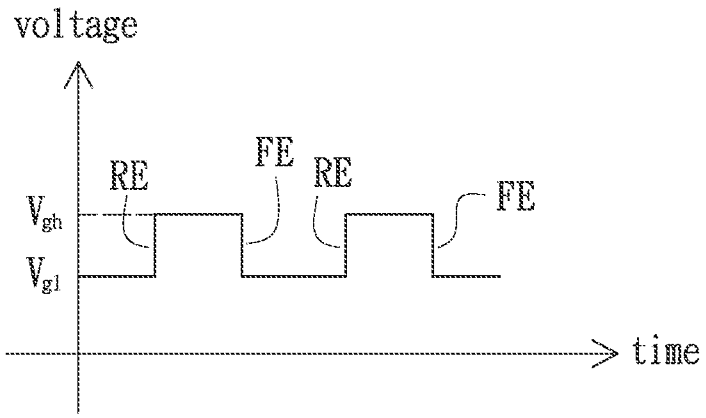
FIG. 8B (Prior Art)
FIG. 8B is a signal wave diagram of a driving signal employed in a gate driving module of FIG. 7 for driving a scanning line.

The data driving module 31 includes a plurality of data driving unit 310, 312 and 314. The control circuit 32 includes a plurality of gate driving units 320, 322, 324 and a signal generating module 330. An equivalent circuit of each pixel unit of the pixel units 360, 362, 364 is shown in FIG. 8A. The number of the above described data lines, scanning lines, pixel units, data driving units, gate driving units and signal generating module is illustrated to conveniently describe this embodiment but not limited.

As showing in the FIG. 1, the data lines 340, 342, and 344 are paralleled extended on the display panel 300 along a special direction, hereafter call as a first direction. The scanning lines 350, 352 and 354 are paralleled extended on the display panel 300 along another special direction, hereafter call as a second direction. The data lines 340, 342, 344 are used to transmit image data configured for displaying image. The scanning lines 350, 352, 354 are respectively used to transmit scanning signals configured for turning on/off the pixel units 360, 362, 364.

When the scanning lines 350, 352, 354 are used to transmit scanning signals configured for turning on the pixel units 360, 362, 364, the gate driving units 320, 322, 324 need to provide corresponding gate high level voltage signals to the scanning lines 350, 352, 354. In the exemplary embodiment, the gate high level voltage signals provided by the gate driving units 320, 322, 324 and enable signals for controlling those gate driving units 320, 322, 324 to be actuated are generated by the signal generating module 330.

The enable signals are sequentially transmitted along a direction from the gate driving unit 320 to the gate driving units 322, 324 and gradually far from the signal generating module 330. As soon as an enable signal is transmitted to start up one of the gate driving units, such as the gate driving unit 322, the gate driving unit permits the received gate high level voltage signals to be passed therefrom and transmitted to the corresponding scanning line, such as the scanning line 352. In addition, according to feed-through effect with different degrees, the signal generating module 330 generates at least two different gate high level voltage signals and provides to the gate driving units 320, 322, 324.

Figure 2:
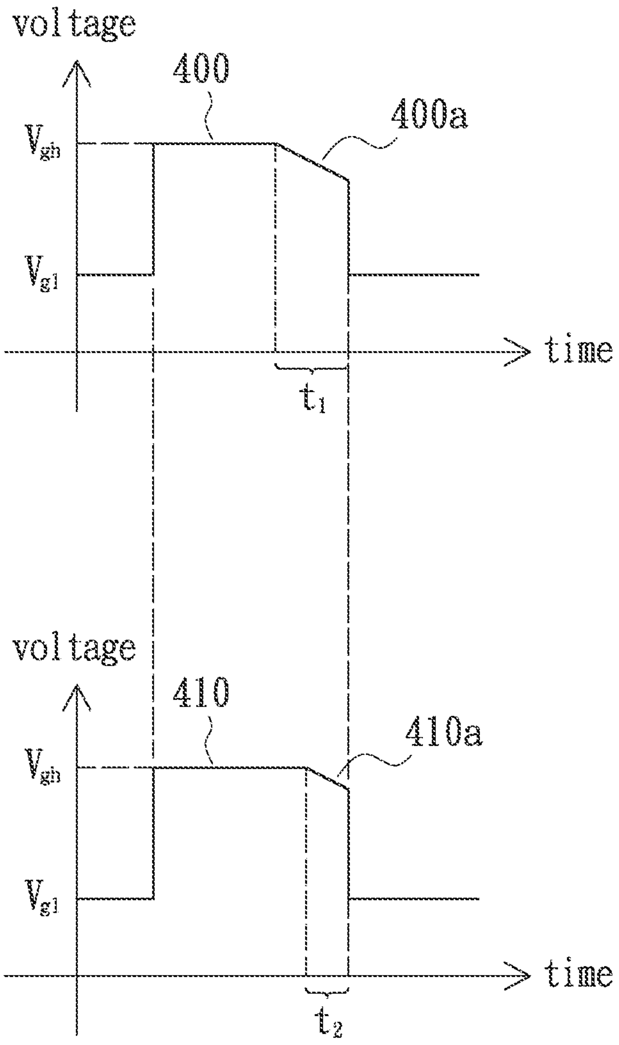
FIG. 2 is a signal wave diagram showing two different gate high level voltages signals.

Referring to FIG. 2 together, a signal wave diagram of the two different gate high level voltage signals is shown. Operating periods of the gate high level voltage signals 400 and 410 are substantially same. The gate high level voltage signals 400 and 410 have two falling edges 400*a* and 410*a* with inclination respectively. The inclination of the falling edge 400*a* has a slope the same as that of the inclination of the falling edge 410*a*. However, a duration time of the falling edge 400*a* of the gate high level voltage signals 400 is different from that of the falling edge 410*a* of the gate high level voltage signals 410. In the exemplary embodiment, the duration time of the falling edge 400*a* is t1, the duration time of the falling edge 410*a* is t2 and t1 is longer than t2. Because the feed-through voltages $V_f$ respectively corresponding to the pixel units of the display panel 300 are different.

Particularly in the vertical direction, the difference of the feed-through voltages $V_f$ are mainly caused by a voltage drop of a current and a resistance. When the gate high level voltage Vgh and the gate low level voltage Vgl are provided to the display panel 300, and transmitted along metal lines or thin film lines (on the display panel 300), the voltage difference (Vgh−Vgl) of the gate lines is gradually decreased with the signals being transmitted downward along the conductive lines 326 in the control circuit 32. The feed-through voltage $V_f$ can be obtained according to following formula:

$$V_f = (V_{gh} - V_{gl})\frac{C_{GD}}{C_S + C_{LC} + C_{GD,ON}}$$

wherein, $C_{GD,ON}$ is a parasitic capacitor of a conductive thin film transistor 200 of FIG. 8A. Because the gate driving unit far from the signal generating module 330 (as showing in FIG. 1, a distance between the gate driving unit 322 and the signal generating module 330 is farther than the distance between the gate driving unit 320 and the signal generating module 330) has a lesser voltage difference (Vgh−Vgl), the corresponding feed-through voltage $V_f$ is decreased. Thus, the high level voltage signal 400*a* having a falling edge with the longer duration time, hereafter call as a first high level voltage signal, is provided to a gate driving unit close to the signal generating module 330. The high level voltage signal 410*a* having a falling edge with the shorter duration time, hereafter call as a second high level voltage signal, is provided to a gate driving unit far away from the signal generating module 330.

Figure 3:
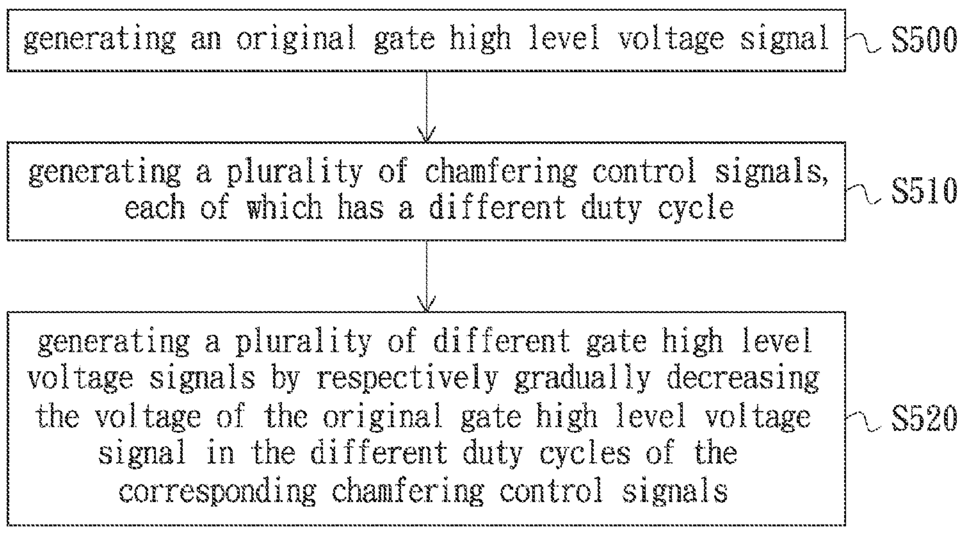
FIG. 3 is a flow chart of generating gate high level voltage signals with different duration time according to an exemplary embodiment.

The following description will explain how to generate the gate high level voltage signals with different duration time. Referring to FIG. 3, a flow chart of generating gate high level voltage signals with different duration time is shown according to an exemplary embodiment.

Step S500 is generating an original gate high level voltage signal defined as a basis. Step S510 is generating a plurality of chamfering control signals, each of which has a different duty cycle. Step S520 is generating a plurality of different gate high level voltage signals by respectively gradually decreasing the voltage of the original gate high level voltage signal in the different duty cycles of the corresponding chamfering control signals.

Figure 4:
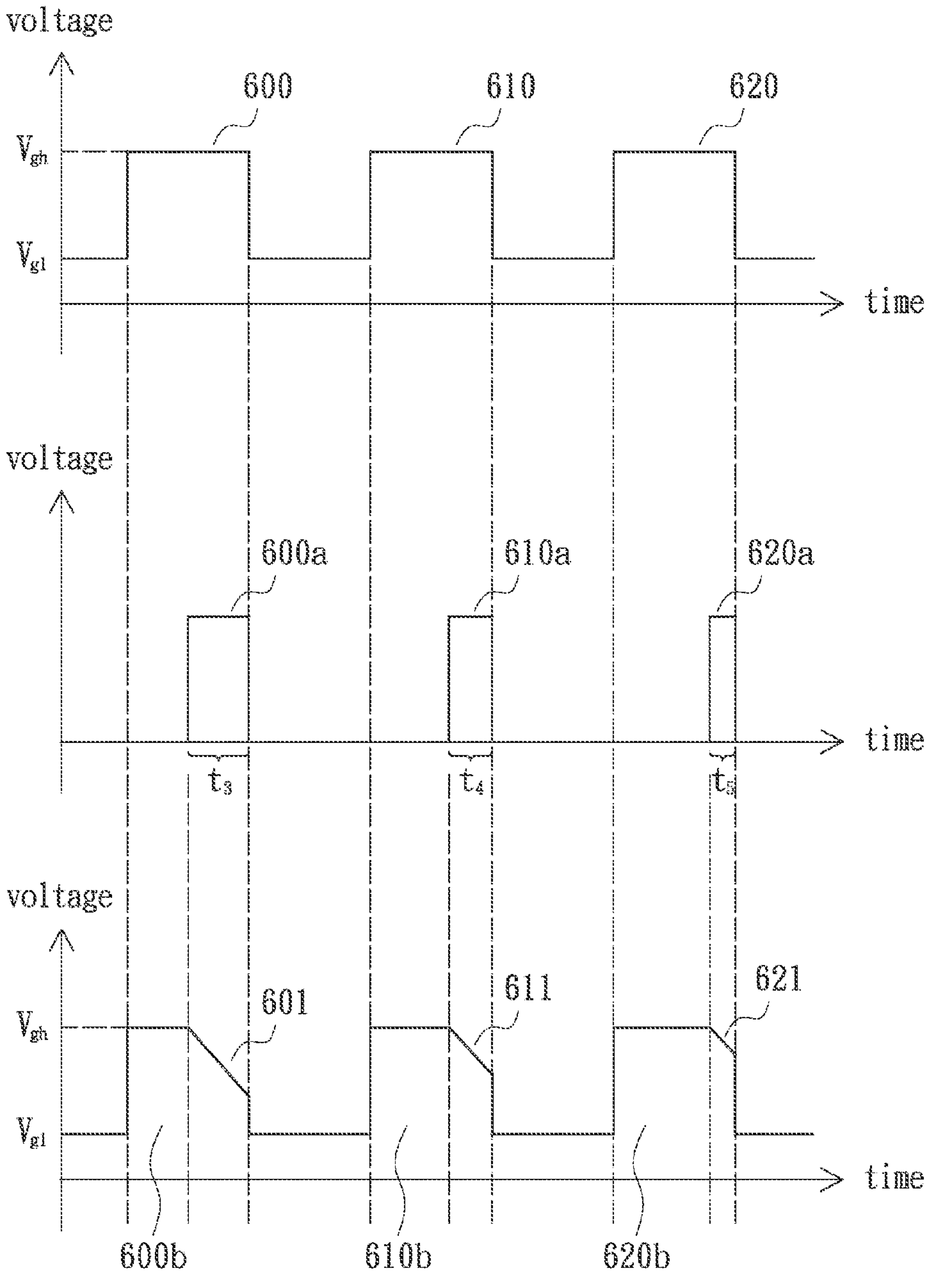
FIG. 4 is a schematic diagram illustrating generating gate high level voltage signals having falling edges with different duration time.

The original gate high level voltage signal generated in step S500 can be denoted by any one of the original gate high level voltage signals 600, 610, 620 as showing in FIG. 4. An amplitude of the original gate high level voltage signal is vibrated between the gate high level voltage Vgh and the gate low level voltage Vgl. An exemplary chamfering control signals referred in the step S510 can be denoted by chamfering control signals 600*a*, 610*a*, 620*a* as showing in FIG. 4. The chamfering control signals 600*a*, 610*a* and 620*a* respectively have a different duty cycle $t_3$, $t_4$ and $t_5$.

As showing in FIG. 4, the original gate high level voltage signals 600, 610 and 620 respectively correspond to the chamfering control signals 600*a*, 610*a* and 620*a*.

The voltage of the original gate high level voltage signal 600 is gradually decreased in the duty cycle $t_3$ of the chamfering control signal 600*a* by a fixed slope to form a gate high level voltage signal 600*b* with a falling edge 601. Similarly, the voltage of the original gate high level voltage signal 610 is gradually decreased in the duty cycle $t_4$ of the chamfering control signal 610*a* by the fixed slope to form a gate high level voltage signal 610*b* with a falling edge 611, and the voltage of the original gate high level voltage signal 620 is gradually decreased in the duty cycle $t_5$ of the chamfering control signal 620*a* by the fixed slope to form a gate high level voltage signal 620*b* with a falling edge 621.

Figure 5:
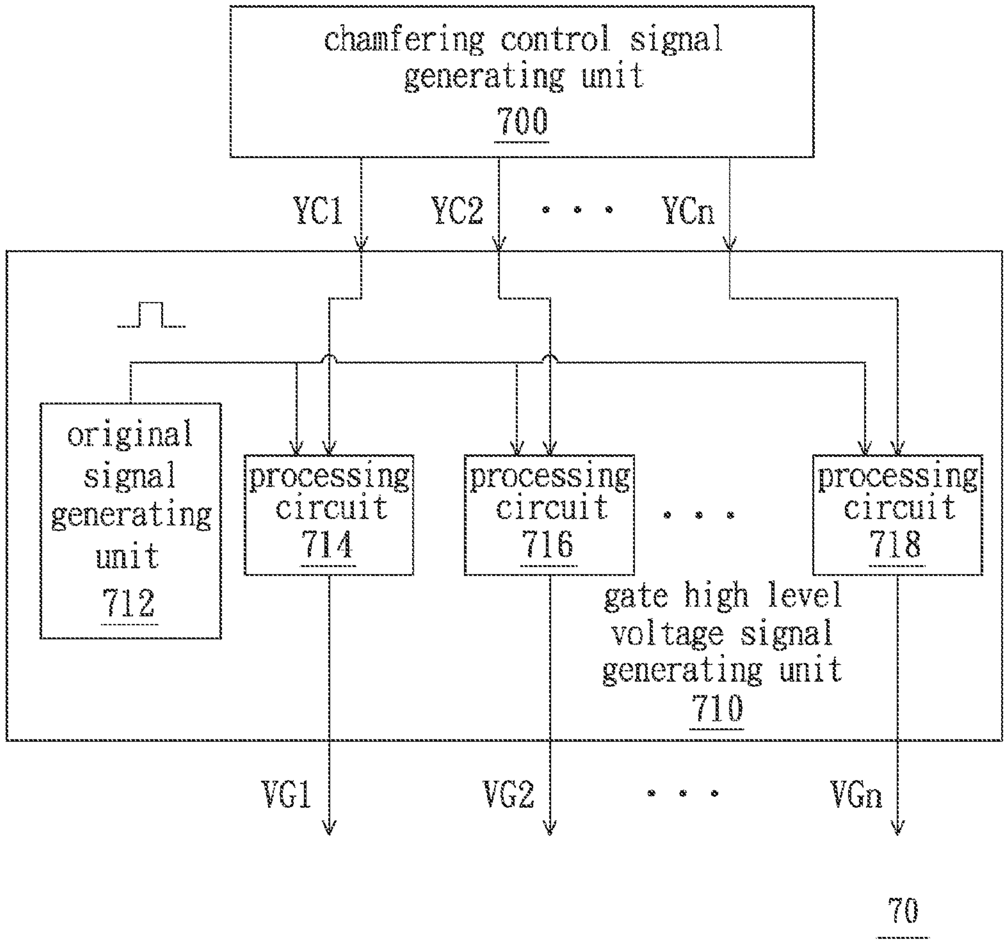
FIG. 5 is a circuit block of a signal generating module according to an exemplary embodiment.

Although in the exemplary embodiment of FIG. 4, the corresponding gate high level voltage signals are generated by using a plurality of original high level voltage signals, in an alternative embodiment, the corresponding gate high level voltage signals can also be generated in a manner as showing in FIG. 5. That is, only one original high level voltage signal is generated and transmitted to a plurality of circuits to generate different gate high level voltage signals after the original high level voltage signal being processed respectively in accordance with corresponding chamfering control signals.

Referring to FIG. 5, a block diagram of an exemplary signal generating module 70 is shown. The signal generating module 70 includes a chamfering control signal generating unit 700 and a gate high level voltage signal generating unit 710. The gate high level voltage signal generating unit 710 includes an original signal generating unit 712, and a plurality of processing circuits 714, 716 . . . 718. The chamfering control signal generating unit 700 is configured to generate a plurality of different chamfering control signals YC1, YC2 . . . YCn and provide the chamfering control signals YC1, YC2 . . . YCn to the gate high level voltage signal generating unit 710.

The original signal generating unit 712 is firstly employed to generate an original gate high level voltage signal as showing in FIG. 4 and respectively provide the original gate high level voltage signal to the processing circuits 714, 716 . . . 718. At the same time, the processing circuits 714, 716 . . . 718 respectively process the received the chamfering control signals YC1, YC2 . . . YCn incorporated with the original gate high level voltage signal to obtain corresponding high level voltage signals VG1, VG2 . . . VGn.

Understandably, in an alternative embodiment, the original gate high level voltage signal employed in the gate high level voltage signal generating unit 710 can also be generated by other circuit of the flat display device 30 and then provided to the gate high level voltage signal generating unit 710. The above described exemplary circuit is given by way of example, and not limitation.

Except the above described circuit and method of the exemplary embodiments, a plurality of detailed adjusting parts of an alternative embodiment of the present invention are also provided. For example, referring to FIG. 6, a block diagram of an exemplary control circuit 82 according to an alternative embodiment is shown. In the exemplary embodiment, the control circuit 82 includes a signal generating module 830 and a plurality of gate driving units 820, 822, 824 et al. The signal generating module 830 provides different gate high level voltage signals to the gate driving units 820, 822, 824 via a respective conducting line. In FIG. 1, the gate driving units 320, 322, 324 are electrically coupled to the signal generating module 300 via a same conducting line or a same electronic route. Thus the gate high level voltage signals provided by the signal generating module 330 can all be received by each of the gate driving units 320, 322 and 324.

Figure 6:
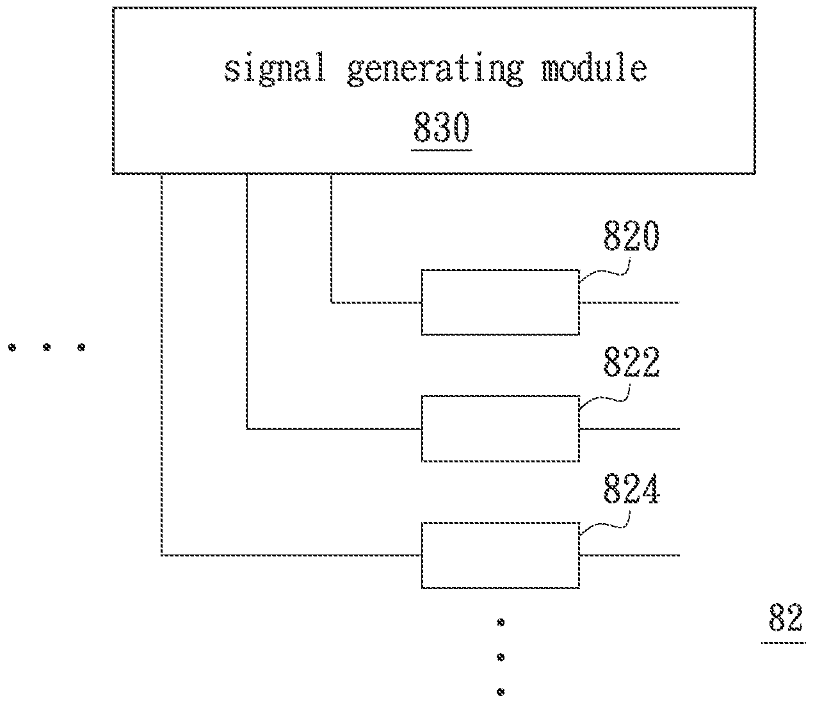
FIG. 6 is a circuit block of a control circuit according to an alternative embodiment.
Figure 7:
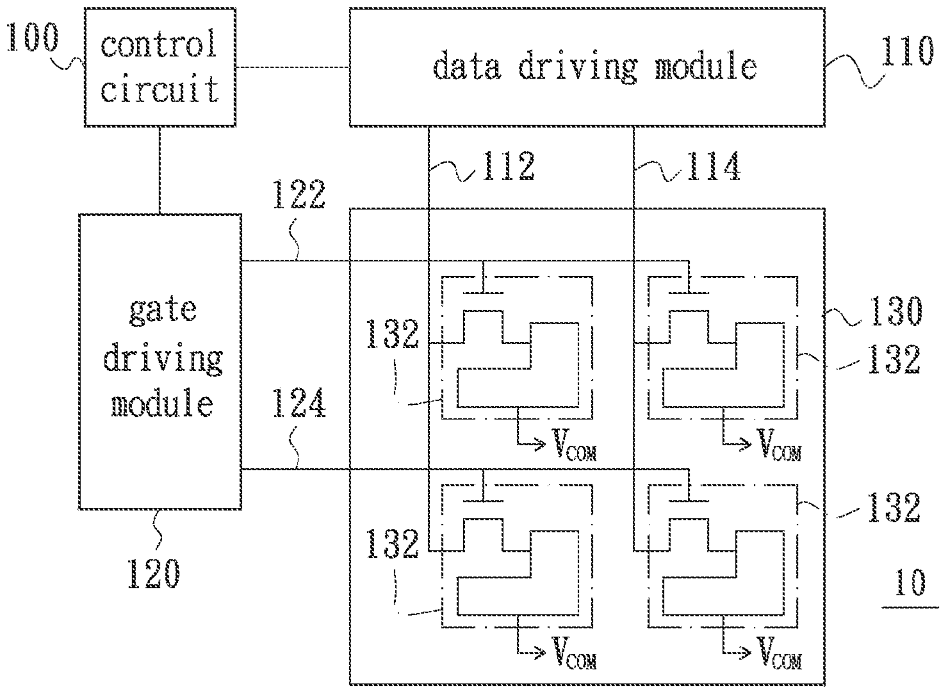
FIG. 7 (Prior Art)
FIG. 7 is a circuit block diagram of a conventional liquid crystal display.

Comparing with FIG. 1, the gate driving units 820, 822 and 824 of the control circuit 82 showing in FIG. 6 are respectively electrically connected to the signal generating module 830 via different conducting lines, thus each gate high level voltage signal can be independently transmitted to the corresponding gate driving unit.

In further alternative embodiments, for example, a plurality of gate driving units can be defined as a gate driving group for using a same gate high level voltage signal. The chamfering control signal generating unit 700 showing in FIG. 5 can also serially output the chamfering control signals YC1, YC2, . . . YCn in a certain order. A circuit design layout of the signal generating module the can also be adjusted as long as the essential technology of the present invention can be achieved.

Because the gate high level voltage signals are generated by decreasing with a same slope in different duration time, the voltage drops in a moment is somewhat changed. Therefore, different compensation effects can be provided according to the feed-through effect generated by the momentary changed voltage drop.

The above description is given by way of example, and not limitation. Given the above disclosure, one skilled in the art could devise variations that are within the scope and spirit of the invention disclosed herein, including configurations of the circuit and/or designs of the control method. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A control circuit of a flat display apparatus comprising a plurality of scanning lines, the control circuit comprising:

a signal generating module for generating a plurality of gate high level voltage signals; and a plurality of gate driving units for receiving the gate high level voltage signals as voltage signals to be provided to all of the plurality of scanning lines of the flat display apparatus;

wherein the plurality of gate high level voltage signals have the same duty cycle, each gate high level voltage signal comprises a first falling edge and a second falling edge, the first falling edge has a slope that is negative and the second falling edge is a vertical line, the first falling edges have the same slope but different duration time;

wherein the duration times of the first falling edges are decreased sequentially so that the further the gate driving unit is away from the signal generating module, the shorter the duration time is for the first falling edge of the corresponding gate high level voltage signal.

2. The control circuit as claimed in claim 1, wherein the signal generating module comprises:

a chamfering control signal generating unit for generating a plurality of chamfering control signals with different duty cycles; and a gate high level voltage signal generating unit electrically coupled to the chamfering control signal generating unit for receiving the chamfering control signals, and the gate high level voltage signal generating unit generating the gate high level voltage signals by referring to the first falling edge of an original gate high level voltage signal which is changed respectively according to the chamfering control signals.

3. The control circuit as claimed in claim 1, wherein the plurality of gate driving units are electrically coupled to the signal generating module via the same electronic route.

4. The control circuit as claimed in claim 1, wherein the plurality of gate driving units are electrically coupled to the signal generating module via their respective electronic routes.

5. The control circuit as claimed in claim 1, wherein the signal generating module comprises:

a chamfering control signal generating unit for generating a plurality of chamfering control signals; and a gate high level voltage signal generating unit comprising:

an original signal generating unit for generating an original gate high level voltage signal; and a plurality of processing circuits, each of the processing circuits being configured for receiving the original gate high level voltage signal and a corresponding one of the chamfering control signals;

wherein each of the processing circuits processes the received chamfering control signal incorporated with the original gate high level voltage signal to obtain a corresponding one of the gate high level voltage signals.

6. A control circuit of a flat display apparatus having a plurality of scanning lines, the control circuit comprising:

a signal generating module for generating a plurality of gate high level voltage signals;

a plurality of gate driving units for receiving the gate high level voltage signals as voltage signals to be provided to all of the plurality of scanning lines of the flat display apparatus; and a chamfering control signal generating unit for generating a plurality of chamfering control signals;

wherein the plurality of gate high level voltage signals have the same duty cycle, each gate high level voltage signal comprises a first falling edge and a second falling edge, the first falling edge has a slope that is negative and the second falling edge is a vertical line, the first falling edges have the same slope but different duration time;

wherein the duration times of the first falling edges are decreased sequentially so that the further the gate driving unit is away from the signal generating module, the shorter the duration time is for the first falling edge of the corresponding gate high level voltage signal.

7. The control circuit as claimed in claim 6, wherein the signal generating module comprises:

a gate high level voltage signal generating unit electrically coupled to the chamfering control signal generating unit for receiving the chamfering control signals, and the gate high level voltage signal generating unit generating the gate high level voltage signals by referring to a first falling edge of an original gate high level voltage signal which is changed respectively according to the chamfering control signals.

8. The control circuit as claimed in claim 6, wherein the signal generating module comprises:

a gate high level voltage signal generating unit comprising:

an original signal generating unit for generating an original gate high level voltage signal; and a plurality of processing circuits, each of the processing circuits receiving the original gate high level voltage signal and a corresponding one of the chamfering control signals;

wherein each of the processing circuits processes the received chamfering control signal incorporated with the original gate high level voltage signal to obtain a corresponding one of the gate high level voltage signals.

9. A control circuit of a flat display apparatus having a plurality of scanning lines and a switch element, the control circuit comprising:

a signal generating module for generating a plurality of gate high level voltage signals; and a plurality of gate driving units for receiving the gate high level voltage signals as voltage signals to be provided to all of the plurality of scanning lines of the flat display apparatus;

wherein each gate high level voltage signal comprises a first falling edge and a second falling edge and the duration times of the first falling edges are decreased sequentially so that the further the gate driving unit is away from the signal generating module, the shorter the duration time is for the first falling edge of the corresponding gate high level voltage signal.

10. The control circuit as claimed in claim 9, wherein the signal generating module comprises:

a chamfering control signal generating unit for generating a plurality of chamfering control signals with different duty cycles; and a gate high level voltage signal generating unit electrically coupled to the chamfering control signal generating unit for receiving the chamfering control signals, and the gate high level voltage signal generating unit generating the gate high level voltage signals by referring to a falling edge of an original gate high level voltage signal which is changed respectively according to the chamfering control signals.

11. The control circuit as claimed in claim 9, wherein the signal generating module comprises:

a chamfering control signal generating unit for generating a plurality of chamfering control signals; and a gate high level voltage signal generating unit comprising:

an original signal generating unit for generating an original gate high level voltage signal; and a plurality of processing circuits, each of the processing circuits receiving the original gate high level voltage signal and a corresponding one of the chamfering control signals;

wherein each of the processing circuits processes the received chamfering control signal incorporated with the original gate high level voltage signal to obtain a corresponding one of the gate high level voltage signals.

12. The control circuit as claimed in claim 9, wherein each gate high level voltage signal comprises a gate-on voltage for turning on the switch element and a gate-off voltage for turning off the switch element, the gate-on voltage has at least two different levels, the duration time of the first gate-on levels of the gate high level voltage signals are decreased in sequence.

* * * * *